Patented Apr. 10, 1945

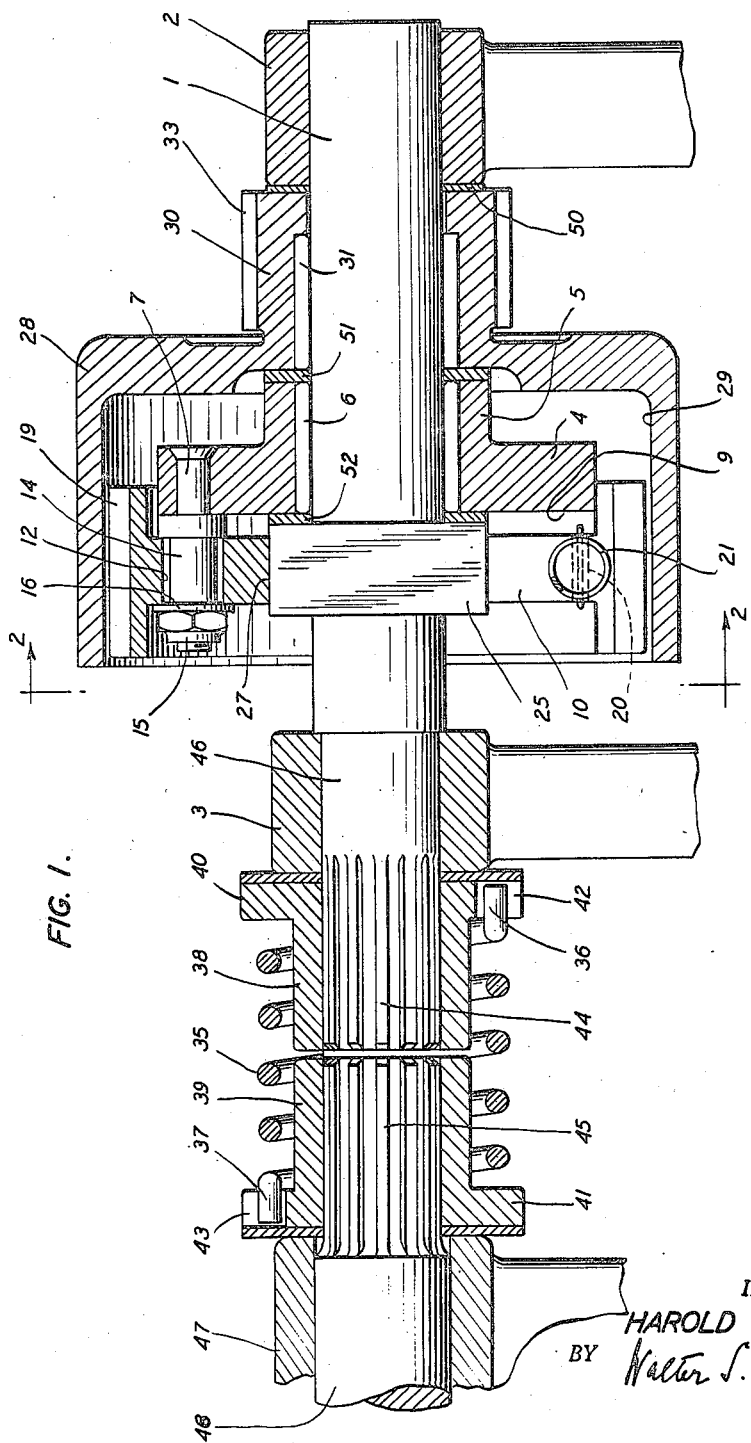

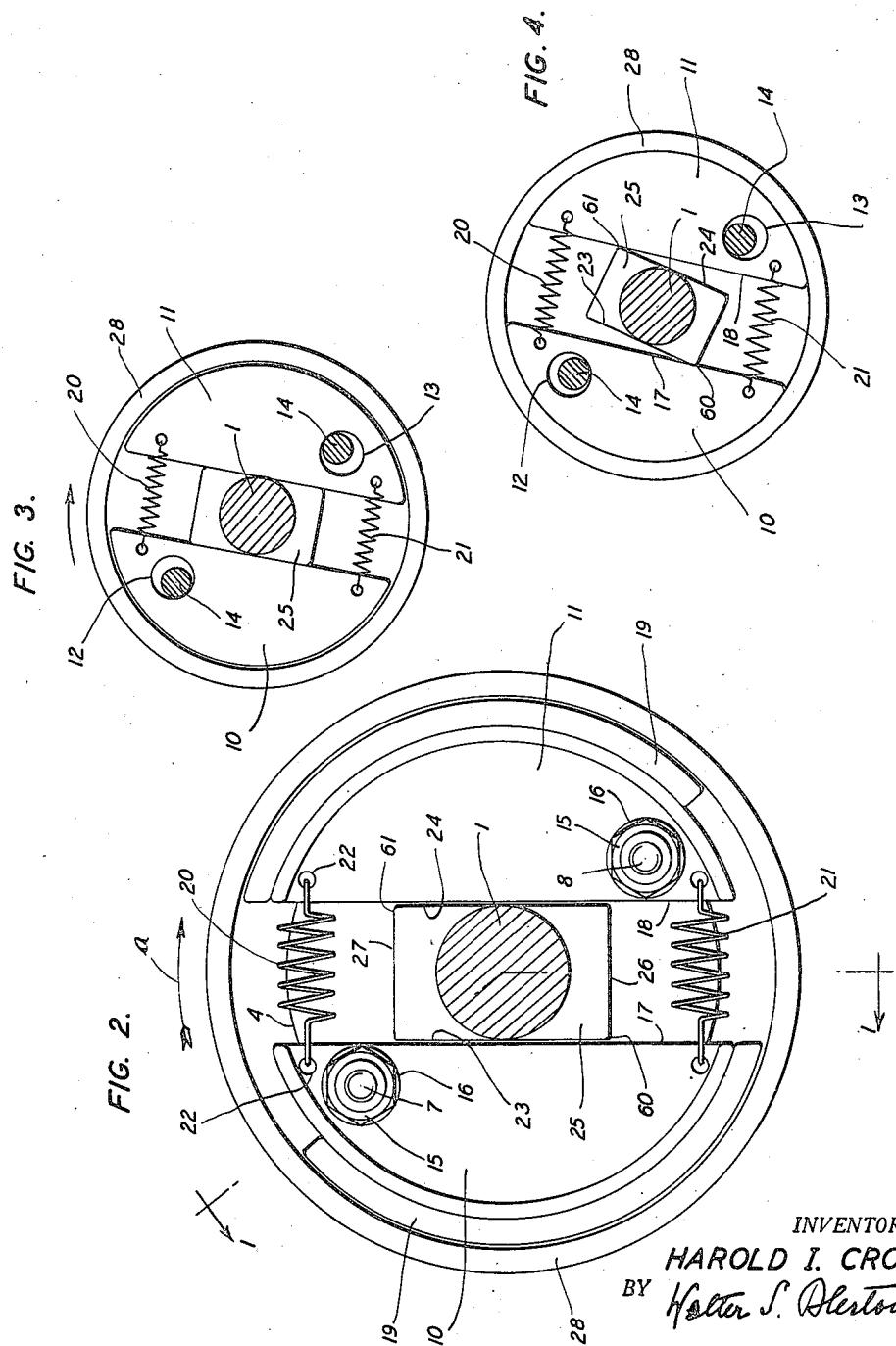

2,373,462

UNITED STATES PATENT OFFICE

2,373,462
FRICTION CLUTCH

Harold I. Crow, Radburn, N. J., assignor to Air Associates, Incorporated, Teterboro, N. J., a corporation of New York Application August 9, 1944, Serial No. 548,723

5 Claims. (Cl. 192—41)

The invention relates to an automatic clutch and more particularly to a friction clutch of the type wherein engagement and disengagement takes place according to the starting and stopping of the driving element. The invention contemplates to provide a mechanism of the mentioned type which responds to accelerations and decelerations of an input shaft. It also aims to provide a clutch which is free from friction when the driven part overruns the driving part. Another object of the invention is the provision of means to insure prompt disengagement of the clutch when the driving element is decelerated.

The invention consists of inertia means effective to initiate the clutching operation in combination with other means for positively locking the clutching elements in engaged position as long as a driving torque prevails. In addition thereto means may be provided to store, during acceleration of the driving part, a force which may be released upon deceleration to facilitate the disengagement of the clutching elements.

Further objects and details of the invention will be apparent from the description given hereinafter and the accompanying drawings illustrating an embodiment thereof by way of example.

In the drawings,

Fig. 1 is a longitudinal section of a clutch mechanism according to my invention, taken along line 1—1 of Fig. 2;

Fig. 2 is a cross-section along line 2—2 of Fig. 1; and

Figs. 3 and 4 are diagrammatical illustrations of the relative shifting of the parts during a clutching operation.

Referring now to the drawings, the clutch comprises a rotatable input shaft 1, shown in Fig. 1 as supported by two bearings 2 and 3. An inertia mass such as disc 4 with hub 5 is carried by shaft 1 through the intermediary of an anti-friction needle bearing 6. Two diametrically opposite studs 7 and 8 are secured to the disc 4 so as to project forward from the front face 9 thereof. The studs hold each a coupling shoe, 10 and 11 respectively; however, the diameters of the holes 12 and 13 in the shoes through which the studs pass, are larger than those of the portions 14 of the studs interiorly of said holes. Nuts 15 with washers 16 are provided on the free ends of the studs in order to prevent movement of the shoes in an axial direction, but do not restrain the shoes from moving relatively to the studs as far as the oversize of the holes 12 and 13 permits. The shoes are substantially of segment shape with faces 17 and 18 respectively constituting the chords of the arcuate faces which are provided with linings 19 of suitable frictional material. Two springs 20 and 21 at opposite ends of the shoes engage the latter in holes 22 and tend to pull them towards each other, that is to say, against the faces 23 and 24 of a cam 25 which may be, as in the present case, of substantially rectangular shape or of another suitable configuration, and which is secured to or integral with shaft 1. The faces 23 and 24 constitute the longer sides of the rectangular cam contour, the length of the shorter sides 26 and 27 being approximately equal to the shaft diameter. A drum 28 with inner cylindrical face 29 surrounds the shoes 10 and 11 and also the disc 4. The drum is mounted with its hub 30 on a needle bearing 31 carried by the shaft 1, so that the drum can freely turn in relation to the shaft. Washers 50, 51 and 52 may be inserted between each two of the parts 2, 30, 4 and 25, respectively, in order to reduce any occurring friction. Hub 30 embodies means to connect the drum 28 to a device intended to be driven by shaft 1 through the intermediary of the clutch members just described. In the case of the illustrated embodiment, where the shaft is supported by an outside bearing 2, the mentioned means may consist in gear teeth 33 for the engagement of another gear. If the general structure is such that no outside bearing 2 is required, the hub 30 may be directly connected to another shaft.

The clutch so far described operates in the following manner. When shaft 1 is accelerated from a standstill in the direction of the arrow and in relation to the drum 28, disc 4 being free on shaft 1 will not be taken along immediately. The shoes 10 and 11, however, will tend to follow the shaft owing to the effect of the springs 20 and 21 which pull them against the faces of cam 25. In consequence, a relative shift will occur between the shoes 10 and 11 and disc 4, so that the portions 14 of the studs 7 and 8 will come to bear against the walls of their respective holes 12 and 13, as diagrammatically shown in Fig. 3. In this position, the disc will be accelerated by the shoes, but owing to the inertia of the disc, an appreciable reaction on the shoes will occur with the result that they are shifted from their original position relatively to cam 1 against the restraint of the springs into the position of Fig. 4, in which they engage the drum 28. This effect of the disc on the shoes will be assisted also by the inertia of the shoes acting in the same direction as the inertia of the disc. Owing to the retarding effect of the friction between the drum and the shoes, the inner faces 17 and 18 of the shoes will now be at an angle to the cam faces 23 and 24 respectively, and the cam corners 60 and 61 will now bear against the faces 17 and 18 to lock the shoes frictionally to the drum 28 so that the drum 28 and disc 4 are taken along synchronously with shaft 1. If shaft 1 is decelerated, the reverse action occurs. The cam corners 60 and 61 will slide along the shoe faces 17 and 18 respectively while the inertia of disc 4 will cause a relative shift so that the stud portions 14 come to bear against the opposite points of the holes 12 and 13, thereby causing a moment turning the shoes wtih their faces 17 and 18 into engagement with the cam faces 23 and 24 and with their arcuate faces out of engagement with the drum. The springs 20 and 21 help in the same direction, so that there is no more friction during the time the drum 28 continues to overrun shaft 1.

The clutch hereinbefore described operates in general very satisfactorily in response to the accelerations and decelerations of the shaft 1. However, I have found that in certain instances, the shoes do not quite readily separate from the drum. In this connection it is to be considered that the force of springs 20 and 21 must be correctly selected according to the inertia of the disc 4, and cannot be very strong if it is the intention to do with a reasonably small inertia mass. The force of the springs 20 and 21, best suited to the purpose, can be easily ascertained by trial. It may happen, therefore, that there still remains friction between the parts or that the clutch stays even fully engaged during a time when no driving torque is transmitted.

Such conditions may prevail for instance, if shaft 1 is coupled to the rotor of a prime mover and if, then the power of the prime mover is shut off and, more or less, suddenly, a braking force is applied to the drum and/or to the parts driven by it. In that event, shaft 1 may tend to overrun the drum owing to its inertia and that of the rotor of the prime mover. In consequence, the cam 25 will remain in its position of Fig. 4 relatively to the shoes 10 and 11 during the deceleration period and even after all parts have come to a standstill. When, then, the shaft 1 is started again, the desired inertia effect of the clutch could not occur and the latter would function similarly to a positive coupling. To prevent the occurrence of such drawback, I provide means whereby a force may be stored during the time a driving torque is transmitted, i. e. while shaft 1 overruns drum 28, such force to be released when the driving power is shut off, in order to create a torque reversing the driving shaft and, thereby restoring the parts to their relative position of Fig. 2. For this purpose, shaft 1 is not directly connected to a drive shaft of a prime mover, but by a torsion spring 35 secured with its ends 36 and 37 to two sleeves 38 and 39 respectively. The sleeves are interiorly splined at 44 and 45 and provided with flanges 40 and 41 which are recessed at 42 and 43 to anchor therein the mentioned ends of the spring. Sleeve 38 is thus secured to the free end 46 of shaft 1, whereas sleeve 39 may be secured to a prime mover shaft 48, supported by a bearing 47 in coaxial alignment with shaft 1. If now, shaft 48 starts to rotate a resistant torque will be set up first by the inertia disc and, then, additionally by the drum 28 and the entirety of the connected driven parts, so that spring 35 will be contracted until its torsion balances the mentioned torque. Thereupon the drum will be rotated with the speed of the shaft 48, the transmission of torques from shaft 1 to the drum taking place as hereinbefore described. If, on the other hand, power to shaft 48 is shut off and drum 28 is braked, the braking force transmitted to shaft 48 will cause a torque acting in the same direction as the aforementioned driving torque. As soon, however, as the parts come to a standstill, that means when the torque owing to the braking disappears, the torsion of the spring 35 will be released to turn shaft 1 backwards sufficiently to restore the parts to their original relative position. Other spring arrangements are of course also possible whereby the desired result may be obtained, it being necessary only that such spring or springs are operative to store during a driving period, a force which can be released to cause a torque reversing the cam shaft when rotation of the system is stopped.

It will be apparent to those skilled in the art that many alterations and modifications of the mechanism illustrated and described are possible without departing from the spirit and essence of my invention which for this reason shall be limited only by the scope of the appended claims.

I claim:

1. In a friction clutch including a cam-provided input member, an output member and clutch shoes operable by said cam to frictionally couple said input member to said output member, the combination of an inertia mass in coaxial arrangement with said input and output members, said mass being free to turn a limited angle in relation to said input member and being floatingly connected to said shoes for a limited movement in relation thereto so as to cause an initial frictional engagement of said shoes and said output member when lagging in relation to said input member upon an acceleration of the latter, and a torque-storing means secured to said input member and adapted to connect said input member to a prime mover shaft for rotation.

2. A clutch comprising a rotatable input member, a drum-shaped output member, an inertia mass in coaxial arrangement with said input and output members and free to turn a limited angle in relation to said input member, a pair of segment-shaped clutch shoes adapted for frictional engagement with said drum and floatingly anchored to said inertia mass for a limited movement in relation thereto, a cam secured to said input member between said shoes so as to press them against said drum upon an angular movement of said input member relatively to said shoes, resilient means attached to both shoes and tending to pull them towards each other, and a torque-storing means secured to said input member and adapted to connect said input member to a prime mover shaft for rotation.

3. A clutch comprising a rotatable input member, a drum-shaped output member, an inertia mass in coaxial arrangement with said input and output members and free to turn a limited angle in relation to said input member, a pair of segment-shaped clutch shoes adapted for frictional engagement with said drum and floatingly anchored to said inertia mass for a limited movement in relation thereto, a cam secured to said input member between said shoes so as to press them against said drum upon an angular movement of said input member relatively to said shoes, resilient means attached to both shoes and tending to pull them towards each other, and resilient means secured to said input member and adapted to connect said input member to a prime mover shaft so as to transmit driving power from the prime mover to said input member and to store energy during a driving period for a short angular reversal of the input member at the end of such period.

4. In a friction clutch including a cam-privided input member, an output member and clutch shoes operatable by said cam to frictionally couple said input member to said output member, the combination of an inertia mass in co-axial arrangement with said input and output members, said mass being free to turn a limited angle in relation to said input member, and being floatingly connected to said shoes for a limited movement in relation thereto so as to cause an initial frictional engagement of said shoes and said output member when lagging in relation to said input member upon an acceleration of the latter, a torsion spring secured with one of its end to said input member, and means secured to the other end of said torsion spring to connect it to a prime mover shaft.

5. A clutch comprising a rotatable input member, a drum-shaped output member, an inertia mass in coaxial arrangement with said input and output members and free to turn a limited angle in relation to said input members, a pair of segment-shaped clutch shoes adapted for frictional engagement with said drum and floatingly anchored to said inertia mass for a limited movement in relation thereto, a cam secured to said input member between said shoes so as to press them against said drum upon an angular movement of said input member relatively to said shoes, resilient means attached to both shoes and tending to pull them towards each other, a torsion spring secured with one of its ends to said input member, and means secured to the other end of said torsion spring to connect it to a prime mover shaft.

HAROLD I. CROW.